(12) United States Patent
Roth et al.

(10) Patent No.: US 8,273,266 B2
(45) Date of Patent: *Sep. 25, 2012

(54) COPPER-ALKALINE-EARTH-SILICATE MIXED CRYSTAL PHOSPHORS

(75) Inventors: Gundula Roth, Levenhagen (DE); Walter Tews, Greifswald (DE); Chung Hoon Lee, Gwangmyeong-si (KR)

(73) Assignee: Seoul Semiconductor Co., Ltd., Seoul (KR)

( * ) Notice: Subject to any disclaimer, the term of this patent is extended or adjusted under 35 U.S.C. 154(b) by 660 days.

This patent is subject to a terminal disclaimer.

(21) Appl. No.: 12/093,441

(22) PCT Filed: Nov. 10, 2006

(86) PCT No.: PCT/KR2006/004716
§ 371 (c)(1),
(2), (4) Date: Aug. 18, 2008

(87) PCT Pub. No.: WO2007/055538
PCT Pub. Date: May 18, 2007

(65) Prior Publication Data
US 2009/0152496 A1  Jun. 18, 2009

(30) Foreign Application Priority Data
Nov. 11, 2005 (KR) .................. 10-2005-0108274
Nov. 9, 2006 (KR) .................. 10-2006-0110490

(51) Int. Cl.
*C09K 11/08* (2006.01)
*C09K 11/66* (2006.01)
(52) U.S. Cl. ............... 252/301.4 F; 252/301.4 H
(58) Field of Classification Search ............ 252/301.4 F, 252/301.4 R, 301.4 H; 313/467, 468, 503; 257/E33.061, 31.129
See application file for complete search history.

(56) References Cited

U.S. PATENT DOCUMENTS

| | | | |
|---|---|---|---|
| 2,110,162 A | 3/1938 | Leverenz |
| 2,402,760 A | 6/1946 | Leverenz |
| 2,570,136 A | 10/1951 | Lyon |
| 2,617,773 A | 11/1952 | Nagy et al. |
| 2,719,128 A | 9/1955 | Kressin et al. |
| 2,780,600 A | 2/1957 | Wollentin |
| 3,143,510 A | 8/1964 | Wanmaker et al. |
| 3,598,752 A | 8/1971 | Sisneros et al. |
| 3,644,212 A | 2/1972 | McAllister et al. |
| 3,893,939 A | 7/1975 | De Kalb et al. |
| 3,905,911 A | 9/1975 | Kelsey, Jr. et al. |
| 4,215,289 A | 7/1980 | De Hair et al. |
| 4,770,950 A | 9/1988 | Ohnishi |
| 4,972,086 A | 11/1990 | Bryan et al. |
| 5,032,316 A | 7/1991 | Takahashi et al. |
| 5,433,295 A | 7/1995 | Murphy |
| 5,472,636 A | 12/1995 | Forster et al. |
| 5,518,808 A | 5/1996 | Bruno et al. |
| 5,770,110 A | 6/1998 | Schrell et al. |
| 5,770,111 A | 6/1998 | Moriyama et al. |
| 5,853,614 A | 12/1998 | Hao et al. |
| 5,952,681 A | 9/1999 | Chen |
| 5,965,192 A | 10/1999 | Potter |
| 5,998,925 A | 12/1999 | Shimizu |
| 6,045,722 A | 4/2000 | Leblans et al. |
| 6,066,861 A | 5/2000 | Hohn et al. |
| 6,084,250 A | 7/2000 | Justel et al. |
| 6,373,184 B1 | 4/2002 | Suh et al. |
| 6,472,765 B1 | 10/2002 | Sano |
| 6,482,664 B1 | 11/2002 | Lee |
| 6,565,771 B1 | 5/2003 | Ono et al. |
| 6,670,751 B2 | 12/2003 | Song et al. |
| 6,686,691 B1 | 2/2004 | Mueller |
| 6,842,664 B2 | 1/2005 | Harada |
| 6,982,045 B2 | 1/2006 | Menkara et al. |
| 6,982,048 B1 | 1/2006 | Atwater et al. |
| 6,987,353 B2 | 1/2006 | Menkara et al. |
| 7,019,335 B2 | 3/2006 | Suenage |
| 7,029,602 B2 | 4/2006 | Oshio |
| 7,045,078 B2 | 5/2006 | Choi |

(Continued)

FOREIGN PATENT DOCUMENTS

AT           410266           3/2003

(Continued)

OTHER PUBLICATIONS

Non-final office action dated Nov. 2, 2009 issued in U.S. Appl. No. 12/098,263, filed Apr. 4, 2008.
Chinese Office Action dated Feb. 15, 2008 issued in Chinese Patent App No. 20051002304.2 corresponding to U.S Appl. No. 11/024,722.
Non-final office action dated Jan. 13, 2010 issued in U.S. Appl. No. 11/569,060, filed Jun. 22, 2007.
Lee, Chung-Hoon, et al., Unpublished U.S. Appl. No. 12/491,780.
Notice of Allowance dated May 4, 2009 issued in U.S. Appl. No. 11/024,702.

(Continued)

*Primary Examiner* — Emily Le
*Assistant Examiner* — Lynne Edmondson
(74) *Attorney, Agent, or Firm* — H.C. Park & Associates, PLC

(57) ABSTRACT

This invention relates to luminescent materials for ultraviolet light or visible light excitation comprising copper-alkaline-earth dominated inorganic mixed crystals activated by rare earth elements. The luminescent material is composed of one or more than one compounds of silicate type and/or germinate or germanate-silicate type. Accordingly, the present invention is a very good possibility to substitute earth alkaline ions by copper for a shifting of the emission bands to longer or shorter wavelength, respectively. Luminescent compounds containing Copper with improved luminescent properties and also with improved stability against water, humidity as well as other polar solvents are provided. The present invention is to provide copper containing luminescent compounds, which has high correlated color temperature range from about 2,000K to 8,000K or 10,000K and CRI up to over 90.

4 Claims, No Drawings

U.S. PATENT DOCUMENTS

| | | |
|---|---|---|
| 7,138,770 B2 | 11/2006 | Uang et al. |
| 7,189,340 B2 | 3/2007 | Shimomura et al. |
| 7,206,507 B2 | 4/2007 | Lee et al. |
| 7,229,571 B2 | 6/2007 | Ezuhara |
| 7,244,965 B2 | 7/2007 | Andrews et al. |
| 7,332,746 B1 | 2/2008 | Takahashi et al. |
| 7,554,129 B2* | 6/2009 | Roth et al. ............ 257/100 |
| 7,608,200 B2* | 10/2009 | Seto et al. ............ 252/301.4 F |
| 7,679,101 B2 | 3/2010 | Ota et al. |
| 7,679,281 B2* | 3/2010 | Kim et al. ............ 313/501 |
| 8,070,983 B2* | 12/2011 | Roth et al. ............ 252/301.4 R |
| 8,089,084 B2* | 1/2012 | Roth et al. ............ 257/98 |
| 2002/0015013 A1 | 2/2002 | Ragle |
| 2003/0038295 A1 | 2/2003 | Koda |
| 2003/0168636 A1 | 9/2003 | Dobson |
| 2004/0051111 A1 | 3/2004 | Ota et al. |
| 2004/0135504 A1 | 7/2004 | Tamaki et al. |
| 2004/0136891 A1* | 7/2004 | Kijima et al. ............ 423/263 |
| 2004/0206970 A1 | 10/2004 | Martin |
| 2004/0251809 A1* | 12/2004 | Shimomura et al. ............ 313/485 |
| 2005/0001225 A1 | 1/2005 | Yoshimura et al. |
| 2005/0001537 A1 | 1/2005 | West et al. |
| 2005/0029927 A1 | 2/2005 | Setlur et al. |
| 2005/0117334 A1 | 6/2005 | Lee |
| 2005/0139846 A1 | 6/2005 | Park et al. |
| 2005/0141048 A1 | 6/2005 | Mizutani |
| 2005/0239227 A1 | 10/2005 | Aanegola et al. |
| 2005/0264161 A1 | 12/2005 | Oaku et al. |
| 2005/0274930 A1 | 12/2005 | Roth et al. |
| 2005/0274972 A1 | 12/2005 | Roth et al. |
| 2006/0158090 A1 | 7/2006 | Wang et al. |
| 2006/0261309 A1 | 11/2006 | Li et al. |
| 2006/0261350 A1 | 11/2006 | Kawazoe et al. |
| 2006/0267042 A1 | 11/2006 | Izuno et al. |
| 2007/0029526 A1 | 2/2007 | Cheng et al. |
| 2007/0247051 A1 | 10/2007 | Kuze et al. |
| 2007/0284563 A1 | 12/2007 | Lee |
| 2008/0036364 A1 | 2/2008 | Li et al. |
| 2008/0067472 A1 | 3/2008 | Roth et al. |
| 2008/0067920 A1 | 3/2008 | Roth et al. |
| 2008/0224163 A1 | 9/2008 | Roth et al. |
| 2009/0050847 A1 | 2/2009 | Xu et al. |
| 2009/0050849 A1 | 2/2009 | Lee |
| 2009/0134413 A1 | 5/2009 | Roth et al. |
| 2009/0262515 A1 | 10/2009 | Lee et al. |
| 2009/0303694 A1 | 12/2009 | Roth et al. |
| 2010/0002454 A1 | 1/2010 | Lee et al. |
| 2010/0207132 A1 | 8/2010 | Lee et al. |

FOREIGN PATENT DOCUMENTS

| | | |
|---|---|---|
| CN | 1218084 | 6/1999 |
| CN | 1289454 | 3/2001 |
| CN | 1317537 | 10/2001 |
| CN | 1344777 | 4/2002 |
| CN | 1434521 | 8/2003 |
| CN | 1707819 | 12/2005 |
| DE | WO9812757 | 3/1998 |
| DE | 10233050 | 2/2004 |
| DE | 10259946 | 7/2004 |
| EP | 0094132 | 11/1983 |
| EP | 0382295 | 8/1990 |
| EP | 0862794 | 9/1998 |
| EP | 0 896 994 | 2/1999 |
| EP | 1249837 | 10/2002 |
| EP | 1249873 | 10/2002 |
| EP | 1605030 | 12/2005 |
| EP | 2031038 | 3/2009 |
| GB | 1336053 | 11/1973 |
| GB | 2016034 | 9/1979 |
| JP | 31-1118 | 2/1956 |
| JP | 33-8177 | 9/1958 |
| JP | 38-6082 | 5/1963 |
| JP | 39-8803 | 5/1964 |
| JP | 47-6258 | 4/1972 |
| JP | 49-38994 | 10/1974 |
| JP | 55135190 | 10/1980 |
| JP | 57109886 | 7/1982 |
| JP | 61258892 | 11/1986 |
| JP | 62-197487 | 9/1987 |
| JP | 5-78659 | 3/1993 |
| JP | 9-40946 | 2/1997 |
| JP | 9040946 | 2/1997 |
| JP | 9-153644 | 6/1997 |
| JP | WO9805078 | 2/1998 |
| JP | 11-177143 | 7/1999 |
| JP | 2000-260580 | 9/2000 |
| JP | 2000-294387 | 10/2000 |
| JP | 2001-115157 | 4/2001 |
| JP | 2001-308393 | 11/2001 |
| JP | 2001-524163 | 11/2001 |
| JP | 2002-057376 | 2/2002 |
| JP | 2002094122 | 3/2002 |
| JP | 2002-97466 | 4/2002 |
| JP | 200297466 | 4/2002 |
| JP | 2002173677 | 6/2002 |
| JP | 2002-531956 | 9/2002 |
| JP | 2002335019 | 11/2002 |
| JP | 2002-359403 | 12/2002 |
| JP | 2002368277 | 12/2002 |
| JP | 200364358 | 3/2003 |
| JP | 2003-133595 | 5/2003 |
| JP | 2003152229 | 5/2003 |
| JP | 2003183649 | 7/2003 |
| JP | 2003-224306 | 8/2003 |
| JP | 2003321675 | 11/2003 |
| JP | 2004-006582 | 1/2004 |
| JP | 2004010786 | 1/2004 |
| JP | 2004-88011 | 3/2004 |
| JP | 2004071726 | 3/2004 |
| JP | 2004-134699 | 4/2004 |
| JP | 2004127988 | 4/2004 |
| JP | 2004-192833 | 7/2004 |
| JP | 2005-100799 | 4/2005 |
| JP | 2005-100800 | 4/2005 |
| JP | 2005-101296 | 4/2005 |
| JP | 2005-153606 | 6/2005 |
| JP | 2005-167177 | 6/2005 |
| JP | 2006-503431 | 1/2006 |
| JP | 2006-073656 | 3/2006 |
| JP | 2006-252944 | 9/2006 |
| JP | 2009-007545 | 1/2009 |
| KR | 100232395 | 12/1999 |
| KR | 10-2001-0032450 | 4/2001 |
| KR | 1020010050839 | 6/2001 |
| KR | 2001-101910 | 11/2001 |
| KR | 1020020000835 | 1/2002 |
| KR | 2002-0053975 | 7/2002 |
| KR | 10-2002-0079513 | 10/2002 |
| KR | 10-2003-0063211 | 7/2003 |
| KR | 10-0392363 | 7/2003 |
| KR | 200382395 | 10/2003 |
| KR | 100426034 | 7/2004 |
| KR | 10-2004-0088418 | 10/2004 |
| KR | 10-2005-0008426 | 1/2005 |
| KR | 10-2005-0070349 | 7/2005 |
| KR | 1020050098462 | 10/2005 |
| KR | 10-2005-0106945 | 11/2005 |
| KR | 10-2005-0108816 | 11/2005 |
| KR | 10-2005-0117164 | 12/2005 |
| KR | 1020050117165 | 12/2005 |
| KR | 100626272 | 9/2006 |
| KR | 10-2006-0134728 | 12/2006 |
| KR | 10-2007-0016900 | 2/2007 |
| KR | 1020070050833 | 5/2007 |
| KR | 10-2007-0064275 | 6/2007 |
| KR | 10-2007-0084659 | 8/2007 |
| KR | 10-2007-0086483 | 8/2007 |
| KR | 10-2007-0098194 | 10/2007 |
| KR | 10-2008-0074241 | 7/2008 |
| KR | 10-2008-0075181 | 7/2008 |
| TW | I328885 | 3/1999 |
| WO | WO 9632457 | 10/1996 |
| WO | 98-39805 | 9/1998 |
| WO | 98-42798 | 10/1998 |
| WO | 00-19546 | 4/2000 |
| WO | 00/33390 | 6/2000 |

| | | |
|---|---|---|
| WO | 01-41215 | 6/2001 |
| WO | 02-054502 | 7/2002 |
| WO | 02-054503 | 7/2002 |
| WO | 02/089219 | 11/2002 |
| WO | 03-021691 | 3/2003 |
| WO | 03/030274 | 4/2003 |
| WO | 2004/036962 | 4/2004 |
| WO | 2004-085570 | 10/2004 |
| WO | 2004-111156 | 12/2004 |
| WO | 2005068584 | 7/2005 |
| WO | WO 2005068584 A1 * | 7/2005 |
| WO | 2005-109532 | 11/2005 |
| WO | 2005-112137 | 11/2005 |
| WO | 2006-043682 | 4/2006 |
| WO | 2006-068359 | 6/2006 |
| WO | 2006/081803 | 8/2006 |
| WO | 2006109659 | 10/2006 |
| WO | 2007-035026 | 3/2007 |
| WO | 2007-055538 | 5/2007 |
| WO | 2007-069869 | 6/2007 |
| WO | 2007-114614 | 11/2007 |
| WO | 2009-028818 | 3/2009 |

OTHER PUBLICATIONS

Non-final office action dated Nov. 29, 2007 issued in U.S. Appl. No. 11/024,702, filed Dec. 30, 2004.
Non-final office action dated Jun. 22, 2006 issued in U.S. Appl. No. 11/024,702, filed Dec. 30, 2004.
Final office action dated Feb. 7, 2007 issued in U.S. Appl. No. 11/024,702, filed Dec. 30, 2004.
Non-final office action dated Nov. 14, 2008 issued in U.S. Appl. No. 11/024,722, filed Dec. 30, 2004.
Non-final office action dated May 29, 2009 issued in U.S. Appl. No. 11/024,722, filed Dec. 30, 2004.
Final office action dated Oct. 28, 2009 issued in U.S. Appl. No. 11/024,722, filed Dec. 30, 2004.
Non-final office action dated Nov. 29, 2006 issued in U.S. Appl. No. 11/024,722, filed Dec. 30, 2004.
Non-final office action dated Nov. 17, 2009 issued in U.S. Appl. No. 12/097,741, filed Oct. 9, 2008.
Non-final office action dated Aug. 12, 2009 issued in U.S. Appl. No. 11/569,060, filed Jun. 22, 2007.
Chinese Office Action dated Dec. 28, 2007 issued in China App No. 200580016844.4 corresponding to U.S. Appl. No. 11/568,769.
Chinese Office Action dated Dec. 28, 2007 issued in China App No. 2005800150173 corresponding to U.S. Appl. No. 11/569,060.
Butler, Keith H., "Fluorescent Lamp Phosphors," The Pennsylvania State University Press, 1980, pp. 281-284.
Phosphor Handbook, edited under the Auspice of Phosphor Research Society, CRC Press New York, 1998, pp. 238, 239, 241.
Wanmaker, W.L. et al., "Luminescence of Copper-Activated Calcium and Strontium Orthophosphates," Journal of the Electrochemical Society, 1959, pp. 1027-1031.
Wanmaker, W.L. et al., Luminescence of Copper-Activated Orthophosphates of the Type ABPO (A=Ca, Sr, or Ba and B=Li, Na or K), Journal of the Electrochemical Society, 1962, pp. 109-113.
van Gool, W., Philips Res. Rept. Suppl., 3, 1, 1961, pp. 1-9, 30-51, 84-85.
Phosphor Handbook, edited under the Auspice of Phosphor Research Society, CRC Press New York, 1998, pp. 239, 256 and Supplemental Page.
Phosphor Handbook, edited under the Auspice of Phosphor Research Society, CRC Press New York, 1998, pp. 179-182 and Supplemental Page.
Angel, R. J. et al., "Structure and Twinning of Single-crystal MgSiO3 Garnet Synthesized at 17 GPa and 1800 [degrees]C", American Mineralogist, 1989, pp. 509-512, vol. 74.
Shinoya, "Phosphor Handbook", edited under the auspice of Phosphor Research Society, CRC Press, 1998, pp. 204-205.
Blasse, "Radiationless Processes in Luminescent Materials", Radiationless Processes, 1980, pp. 287-289, 293.
W.L. Wanmaker, et al. "Luminescence of Phosphors Based on the Host Lattice ABGe2O6 (A, B=Ca, Sr, Ba)" Journal of Solid State Chemistry 3, (1971), pp. 194-196.
X. W. Sun, et al. "Pulsed Laser Deposition of Silicate Phosphor Thin Films", Appl. Phys. A 69, 1999, 5 pages.
Notice of Allowance issued on Jul. 18, 2008 in corresponding U.S. Appl. No. 11/024,702.
Final Office Action dated Oct. 22, 2007 issued in U.S. Appl. No. 11/024,722, filed Dec. 30, 2004.
Shionoya, S., et al. (Eds.), "Principal phosphor materials and their optical properties" in Phosphor Handbook, CRC Press, 1999, p. 826.
Shenstone, A.G., "The Third Spectrum of Copper (Cu III)", Journal of Research of the National Bureau of Standards—A. Physics and Chemistry, vol. 79A, No. 3, May-Jun. 1975, pp. 497-521.
Lever, A.B.P., "Inorganic Electronic Spectroscopy", 2nd ed., Elsevier, 1984, pp. 355 and 557-559.
Dubicki, Lujcan et al., "The First d-d Fluorescence of a Six-Coordinate Copper (II) Ion", J. Am. Chem. Soc., 1989, No. 111, pp. 3452-3454.
Scacco, A., et al., "Optical Spectra of Cu2+ Ions in LiF Crystals", Radiation Effects and Defects in Solids, vol. 134, 1995, pp. 333-336.
Shionoya, S., et al. (Eds.), "Principal phosphor materials and their optical properties" in Phosphor Handbook, CRC Press, 1999, pp. 231-255.
Yang, Ping et al., "Photoluminescence of Cu+-doped and Cu2+-doped ZnS nanocrystallites", Journal of Physics and Chemistry of Solids, No. 63, 2002, pp. 639-643.
Suyver, J.F., et al., "Luminescence of nanocrystalline ZnSe:Cu", Applied Physics Letters, vol. 79, No. 25, Dec. 17, 2001, pp. 4222-4224.
Bol, Ageeth A., et al., "Luminescence of nanocrystalline ZnS:Cu2+", Journal of Luminescence, No. 99, 2002, pp. 325-334.
Non-Final Office Action mailed May 23, 2007 for U.S. Appl. No. 11/024,722, filed Dec. 30, 2004, entitled "Luminescent Material".
Amendment and Declaration under 37 CFR 1.132 filed in response to the Non-Final Office Action mailed May 23, 2007 for U.S. Appl. No. 11/024,722, filed Dec. 30, 2004, entitled "Luminescent Material".
International Search Report for PCT/KR2010/003285 issued on Jan. 24, 2011, corresponding to U.S. Appl. No. 12/773,514.
Non-Final Office Action of U.S. Appl. No. 13/004,554 issued on Mar. 15, 2011.
Notice of Allowance of U.S. Appl. No. 11/024,722 issued on Mar. 10, 2011.
Final Office Action of U.S. Appl. No. 12/196,923 issued on Mar. 4, 2011.
Notice of Allowance of U.S. Appl. No. 11/948,845 issued on Mar. 23, 2011.
Non-Final Office Action of U.S. Appl. No. 12/098,263 issued on Mar. 30, 2011.
Indian Office Action of Indian Application No. 2468/KOLNP/2007 issued on Jan. 28, 2011, corresponding to U.S. Appl. No. 12/098,263.
Non-Final Office Action of U.S. Appl. No. 12/854,001 issued on Apr. 6, 2011.
Non-Final Office Action of U.S. Appl. No. 12/440,001 issued on Apr. 27, 2011.
Bogner et al., DE 102 33 050 A1, Feb. 5, 2004, Machine Traslation.
Non-Final Office Action of U.S. Appl. No. 11/568,769 issued on Feb. 16, 2011.
European Search Report of EP 10 16 4970 issued on Sep. 23, 2010.
TW Office Action of Sep. 10, 2010 in TW Patent Appl. No. 098123458.
IP Australia Office Action dated Jul. 2, 2010 for AU Patent Appl. No. 2005-319965, corresponding to U.S. Appl. No. 12/098,263.
Non-Final Office Action dated Aug. 10, 2010 in U.S. Appl. No. 12/731,811.
Non-Final Office Action dated Aug. 18, 2010 in U.S. Appl. No. 11/948,813.
European Search Report of Oct. 26, 2010 in EP 10 17 7817, corresponding to U.S. Appl. No. 11/024,722.
CN Office Action dated Feb. 5, 2010 in CN Appl. No. 2005100023042.
Final Office Action dated Sep. 9, 2010 in U.S. Appl. No. 11/568,769.
Non-Final Office Action dated Apr. 30, 2010 in U.S. Appl. No. 11/568,769.
Final Office Action dated Jun. 21, 2010 in U.S. Appl. No. 11/569,060.

Non-Final Office Action dated Aug. 10, 2010 in U.S. Appl. No. 11/024,722.
Final Office Action dated Nov. 12, 2010 in U.S. Appl. No. 12/097,741.
Non Final Office Action dated Jun. 16, 2010 in U.S. Appl. No. 12/097,741.
EP Search Report dated Oct. 6, 2010 in EP Appl No. 07745750.5—corresponding to U.S. Appl. No. 12/295,438.
EP Search Report dated Sep. 1, 2010 in EP Appl No. 08015119 correpsonding to U.S. Appl. No. 12/440,001.
Non Final Office Action dated Aug. 17, 2010 in U.S. Appl. No. 11/948,845.
Non Final Office Action dated Mar. 17, 2010 in U.S. Appl. No. 11/024,722.
Final Office Action dated May 11, 2010 in U.S. Appl. No. 12/098,263.
Notice of Allowance dated Aug. 18, 2010 in U.S. Appl. No. 12/098,263.
Non Final Office Action dated Nov. 30, 2010 in U.S. Appl. No. 12/196,923.
Final Office Action dated Nov. 30, 2010 in U.S. Appl. No. 11/024,722.
Non Final Office Action dated Nov. 26, 2010 in U.S. Appl. No. 12/440,001.
Lee, Chung-Hoon, Unpublished U.S. Appl. No. 11/568,769 ; corresponds to WO2005/109532.
N. S. Akhmetov, "Inorganic Chemistry", Moscow "Vysshaya Shkola", 1975.
L. Ya. Markovsky, et al., "Phosphors", Publishing House "Khimiya", Moscow 1966, Leningrad.
Ralchenko, Yu., Kramida, A.E., Reader, J. and NIST ASD Team (2008). NIST Atomic Spectra Database (version 3.1.5), [Online]. Available: http://physics.nist.gov/asd3 [Feb. 27, 2009]. National Institute of Standards and Technology, Gaithersburg, MD.
Roth, Gundula, Unpublished U.S. Appl. No. 12/295,438; corresponds to WO 2007/114614 and KR10-2007-0098194.
Joung Kyu Park, et al., "Silicate Phosphors for White LEDs Identified Through Combinatorial Chemistry", Electrochemical and Solid-State Letters, 10 (2), J15-J18, (2007), XP-002511067.
Joung Kyu Park, et al., "Luminescence Characteristics of Yellow Emitting Ba3SiO5:EU2+ Phosphor", Journal of Materials Science 40 (2005), pp. 2069-2071, XP-002511068.
H.G. Kang, et al., Embodiment and Luminescence Properties of Sr3SiO5:Eu(yellow-orange phosphor) by co-doping lanthanide, Solid State Phenomena, vol. 124-126 (2007) pp. 511-514.
G. Roth, et al. "Advanced Silicate Phosphors for Improved White LED", Global Phosphor Summit Seoul/Korea, Mar. 5-7, 2007, pp. 1-39.
T.L. L Barry, "Equilibria and Eu2+ Luminescence of Subsolidus Phases Bounded by Ba3MgSi2O8, Sr3MgSi2O8 and Ca3MgSi2O8," J. Electrochem. Soc., vol. 115 No. 7 (Jul. 1968), pp. 733-738.
G. Blasse, et al., "Fluorescence of Europium2+-Activated Silicates," Philips Res. Repts 23 (1968), pp. 189-199.
S.D. Jee, et al. "Photoluminescence Properties of Eu2+-activated Sr3SiO5 Phosphors," J. Mater Sci. 41 (2006), pp. 3139-3141.
T.L. Barry, "Fluorescence of Eu2+ Activated Phases in Binary Alkaline Earth Orthosilicate Systems", J. Electrochem Soc., Nov. 1968, pp. 1181-1184.
Lee, Chung-Hoon, et al., Unpublished U.S. Appl. No. 12/440,001; corresponds to WO2009-028818 and KR10-2007-0086483 and KR 10-2008-0075181.
International Search Report dated Aug. 12, 2005 for PCT Application No. PCT/KR2005/001287.
International Search Report dated Aug. 12, 2005 for PCT Application No. PCT/KR2005/001288.
International Search Report dated Oct. 13, 2005 for PCT Application No. PCT/KR2005/002333.
International Search Report dated Oct. 24, 2005 for PCT Application No. PCT/KR2005/002332.
International Search Report dated Feb. 20, 2007 for PCT Application No. PCT/KR2006/004716.
International Search Report dated Jul. 12, 2007 for PCT Application No. PCT/KR2007/001587.
International Search Report dated Mar. 21, 2007 for PCT Application No. PCT/KR2006/005500.
International Search Report dated Feb. 11, 2009 for PCT Application No. PCT/2008/004733.
International Search Report dated Feb. 27, 2009 for PCT Application No. PCT/KR2008/004734.
Search Report dated Apr. 11, 2006 for EP Application No. EP04106880.0.
Search Report dated Aug. 21, 2007 for EP Application No. EP04106882.6.
Search Report dated Nov. 5, 2008 for EP Application No. EP06812549.1.
Search Report dated Feb. 2, 2009 for EP Application No. EP08014684.
Chen, R., "Developments in Luminescence and Display Materials Over the Last 100 Years as reflected in Electrochemical Society Publications", Journal of Electrochemical Society, 149, pp. 69-78, (2002).
G. Blasse, B.C. Grabmeier, "Luminescent Materials", Springer, 1994, pp. 40-47.
G. Blasse and A. Bril, "Characteristic Luminescence", Philips Technical Review, 31 (1970) 304, pp. 306 & 310.
S. Shionoya, W.M. Yen, "Phosphor Handbook" CRC Press, 1999, Ch. 3.3, pp. 179-182.
G. Blasse, B.C. Grabmeier, "Luminescent Materials", Springer, 1994, p. 25.
J. Gacia Sole, L.E. Bausa, D. Jaque, "An Introduction to the Optical Spectroscopy of Inorganic Solids", Wiley, 2005, pp. 163-164.
P.A. Cox, "Transition Metal Oxides", Oxford University Press, 1995, p. 105.
G.L. Miessler, D.A. Tarr, "Inorganic Chemistry", 3rd ed., Pearson/Prentice Hall, pp. 117-118, (2003).
B. Cordero, et al. "Covalent Radii Revisited", Dalton Trans., (2008), pp. 2832-2838.
G. Blasse, B.C. Grabmeier, "Luminescent Materials", Springer, 1994, pp. 87-90.
Feldman, C., "Inorganic Luminescent Materials: 100 Years of Research and Application", Adv. Funct. Matter, 2003, pp. 511-516.
Blasse, G., "Characteristic Luminescence", Philips Technical Review, vol. 31 (1970), pp. 304-332.
Declaration Under Rule 37 CFR 1.132 of Ulrich Kynast dated Sep. 6, 2008.
Shionoya, "Phosphor Handbook", CRC Press, pp. 183-184, (1999).
Garcia Sole, et al., "An Introduction to the Optical Spectroscopy of Inorganic Solids", pp. 132-133, (2005).
"Phosphors for Mercury Lamps" http://www.lamptech.co.uk/Documents/M14%20Phosphors.htm 2003 (2 pages).
Takashi Hase et al., "Phosphor Handbook", CRC Press (3 pages), (1999).
Butler, "Flourescent Lamp Phosphors", The Pennsylvania State University Press, 1980, pp. 175-176.
Butler, "Flourescent Lamp Phosphors", The Pennsylvania State University Press, 1980, pp. 181-182.
Bernhardt, Investigations of the Orange Luminescence of PbMo04 Crystals, Phys. Stat. Sol. (a), 91, 643, 1985, pp. 643-647.
Yang, Conversion Fluorescence in $Er^{3+}Yb^{3+}$Co- Doped Oxy—Fluoride Compound Materials' Based on GeO2, Natural Science Journal of Xiangtan University, vol. 23, No. 2, 2001, pp. 37-41.
First Office Action of the State Intellectual Property Office of the PRC corresponding to Chinese Patent Application No. 20051002304.2 dated Feb. 15, 2008.
Final Office Action dated Apr. 18, 2012 issued for U.S. Appl. No. 12/491,457.
Non-Final Office Action of U.S. Appl. No. 12/854,001 dated Apr. 24, 2012.
Final Office Action of U.S. Appl. No. 12/491,780 dated Apr. 26, 2012.

* cited by examiner

COPPER-ALKALINE-EARTH-SILICATE MIXED CRYSTAL PHOSPHORS

CROSS-REFERENCE TO RELATED APPLICATION

This application is a U.S. national phase application of PCT International Application PCT/KR2006/004716, filed Nov. 10, 2006, which claims priority to Korean Patent Application No. 2006-0110490, filed Nov. 9, 2006, and to Korean Patent Application No. 2005-0108274, filed Nov. 11, 2005, the contents of which are incorporated herein by reference in their entirety.

FIELD OF THE INVENTION

This invention relates generally to copper-alkaline-earth Silicate mixed crystal compounds activated by rare earth elements for using them as luminescent materials for ultraviolet as well as for visible light excitation for examples.

BACKGROUND OF THE INVENTION

Copper is well-known as a monovalent activator in some orthophosphates (Wanmaker, W. L. and Bakker, C., J. Electrochem. Soc. 106, 1027, 1959) with an emission maximum at 490 nm.

The ground state of monovalent copper is a filled shell $3d^{10}$. That is the level $^1S_0$. After exciting the lowest excited configuration is $3d^94s$. This configuration has two terms, $^3D$ and $^1D$. The next higher configuration, $3d^94p$, gives 6 terms $^3P°$, $^3F°$, $^3D°$, $^1F°$, $^1D°$ and $^1P°$. The transitions between the ground state $^1S_0$ and the $^1D$ and $^3D$ are forbidden by parity or spin, respectively. In copper ions the excitation to the crystal field levels of 4p terms are allowed. Emission will be got either by a direct return from the crystal field odd state to the ground state or by a combination of transitions first from the odd state to a crystal field level and after that a second transition from these $^3D$ or $^1D$ state of the $3d^94s$ configuration to the ground state.

The ground state of bivalent copper has $3d^9$-configuration. That is the level $^2D_{5/2}$. In the bivalent copper one of the d-electrons can be excited to the 4s or 4p orbital. The lowest exciting configuration is the $3d^84s$ with two quartet terms $^4F$, $^4P$ and four doublet terms, $^2F$, $^2D$, $^2P$ and $^2G$ without emission caused by forbidden transitions. The higher exciting configuration is the $3d^84p$-configuration with four terms $^4D°$, $^4G°$, $^4F°$, and $^4P°$, where emission can occur.

Copper (I) activated or co-activated sulphide-phosphors are well known and they are commercial used for cathode ray tubes. The green-emitting ZnS:Cu, Al (copper=activator, Al=co-activator) is very important in CRT applications.

In zinc-sulphide phosphors the luminescence can be classified into five kinds, depending on the relative ratio of the concentration of activators and co-activators (van Gool, W., Philips Res. Rept. Suppl., 3, 1, 1961). Here the luminescent centers are formed from deep donors or deep acceptors, or by their association at the nearest-neighbor sites (Phosphor Handbook, edited under the Auspice of Phosphor Research Society, CRC Press New York, Orthophosphates activated by monovalent copper (Wanmaker, W. L., and Spier, H. L., JECS 109 (1962), 109), and pyrophosphates, alumosilicates, silicates, tripolyphosphates all activated by copper (I) are described in "Keith H. Butler, The Pennsylvania State University Press, 1980, S. 281". Such phosphors can only be used for a short wave U.V. excitation, they are not excitable by longerwave radiation above about 350 nm. Because of their unstable chemical properties and their temperature behavior they cannot be used in fluorescent lamps.

The influence of copper ions as host lattice component in oxygen dominated compounds, activated by rare earth ions such as $Eu^{2+}$, $Ce^{3+}$ and others has not yet been described until now. From the theory of luminescent and solid state chemistry it should to be expected that the incorporation of copper as a host lattice component influences the luminescent-optical properties positively regarding improved luminescent intensity as well as desirable shifting of emission maxima, color points, shape of emission spectra and stabilizing of the lattice.

The influence of copper-ion as a component in a solid state mixed crystal should show improved luminescent properties for excitation wavelength higher than 360 nm. In this region of wavelength copper does not show own radiation transfers due to the energy levels of its electron configuration, so that any kind of exciting radiation can't be lost.

Copper containing luminescent mixed crystals or solid solutions should show improved emission intensities compared to luminescent materials having not that component in the host lattice. Furthermore, as a desirable effect copper containing luminescent mixed materials should show a shifting of the emission wavelengths to higher or to lower energies. For mixed crystals containing copper as a basic element this ion doesn't react as activator but the use of this ion leads to an influence of the crystal field splitting as well as the covalence, because copper (II) has a smaller radius (about 60 pm) and the electro-negativity (1.8) is higher than these of Barium, Strontium and Calcium (1). Furthermore, Cu (II) has a positive electrochemical reduction potential of +0.342 in contradiction to the negative potential of Alkaline Earth metals (−2.8 to −2.9).

Here an additional influence should to be expected. Due to the higher ionic potential of copper as a quotient of ionic charge and ionic radius compared to the bigger alkaline earth ions the copper ions can attract the neighboring oxygen ions stronger than the alkaline earth ions. So the substitution of the bigger alkaline earth ions Ca, Sr and Ba by copper leads to a changed crystal field in the surrounding of the activator ions, too. Thus the shape of emission bands can be influenced, the shifting of the emission peak to longer wavelength is connected with a broadening of the emission curves for band emission. Additionally it should be possible to increase the intensity of emission by substitution of copper ion for other basic metal ions. Generally the shifts of emission peaks to longer as well as to shorter wavelength are desirable in the field of LED lighting. Here it is necessary to realize a fine tuning to get a special wavelength for special color points as well as for better brightness of optical devices. By using the basic cation copper for substituting other cations like Ba, Sr, Ca, Mg, Zn and others such a fine tuning should be possible.

It is known, that some luminescent materials and phosphors and also Alkaline Earth Silicate phosphors are unstable in water, air humidity, water steam or polar solvents. For instance silicates with orthorhombic as well as Akermanite or Merwinite structures show more or less high sensitivity to water, air humidity, water steam or polar solvents caused by high basicity. Due to a higher covalence and a lower basicity as well as a positive reduction potential the incorporation of copper in a host lattice should improve this behavior of luminescent materials against water, air humidity and polar solvents if substituted for cations with a high basicity and a strongly negative reduction potential.

SUMMARY OF THE INVENTION

In view of the prior art described above, it is an object of the present invention to provide copper containing luminescent mixed crystal compounds which is a very good possibility to substitute earth alkaline ions by copper for shifting of the emission bands to longer or shorter wave lengths, respectively. In contrast to all papers prior art copper does not act as activator for emitting radiation. It is a component of the metal basic sublattice for modifying some properties determined by the metal ions like lattice parameters, electromagnetivity, surface properties and others, caused by the electromagnetic interactions within the lattice.

Another object of the present invention is to provide luminescent mixed crystal compounds between Copper Silicate and Alkaline Earth Silicates with improved luminescent properties and also with improved stability against water, humidity as well as other polar solvents.

Still another object of the present invention is to provide copper-alkaline-earth luminescent silicate mixed crystals, which have high color temperature range about 2,000K to 8,000K or 10,000K and CRI over 90, when mixed together with other phosphors.

To achieve these and other objects, as embodied and broadly described herein, luminescent materials for ultraviolet light or visible light excitation are containing copper-alkaline-earth mixed crystals from the basic family of Silicates or Germanates.

The luminescent material is composed of one or more than one compounds of silicate which is expressed in Formula 1, germanate/or germanate-silicate which is expressed in Formula 2:

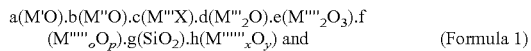

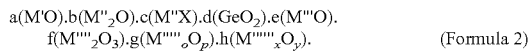

Meanwhile, copper containing mixed crystals are used as a converter for the primary long-wave ultraviolet radiation in the range from 300-400 nm and/or blue radiation in the range from 380-500 nm from one or more single primary elements within a light emitting device to produce light in the visible region of the spectrum up to a high color rendering index Ra>90. And, copper containing mixed crystals characterized in that the phosphors are used in LED as single phosphors and/or in phosphor mixtures with different known phosphors for realizing white light with a color rendering up to a high color rendering >90.

DETAILED DESCRIPTION OF THE PREFERRED EMBODIMENT

Hereinafter, the present invention will be described in detail. Although the present invention has been described in connection with the preferred exemplary embodiments and the drawings, it is not limited thereto. The scope of the present invention is defined by the appended claims. Thus, it will be apparent to those skilled in the art that various changes and modifications can be made thereto without departing from the technical spirit and scope of the invention defined by the appended claims.

EXAMPLE 1

Luminescent materials for ultraviolet light or visible light excitation comprise a copper-alkaline-earth dominated mixed crystal silicate according to Formula 1 as follows:

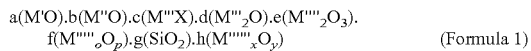

wherein M' is Cu;
M" is at least one or more divalent elements from the group consisting of Be, Mg, Ca, Sr, Ba, Zn, Cd, and Mn;
M''' is at least one or more monovalent elements from the group consisting of Li, Na, K, Rb, Cs, Au, and Ag;
M'''' is at least one or more elements from the group consisting of B, Al, Ga, and In;
M''''' is at least one or more elements from the group consisting of Ge, V, Nb, Ta, W, Mo, Ti, Zr, and Hf;
M'''''' is at least one or more elements from the group consisting of Bi, Sn, Sb, Sc, Y, La, Ce, Pr, Nd, Pm, Sm, Eu, Gd, Tb, Dy, Ho, Er, Tm, Yb, and Lu;
X is at least one or more elements from the group consisting of F, Cl, Br, and I;

$0<a\leq2$;
$0<b\leq8$;
$0\leq c\leq4$;
$0\leq d\leq2$;
$0\leq e\leq2$;
$0\leq f\leq2$;
$0\leq g\leq10$;
$0\leq h\leq5$;
$1\leq o\leq2$;
$1\leq p\leq5$;
$1\leq x\leq2$; and
$1\leq y\leq5$.

Examples of Preparation:
Preparation of the luminescent material having formula:

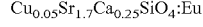

Starting materials: $CuO$, $SrCO_3$, $CaCO_3$, $SiO_2$, $Eu_2O_3$ and/or any combination thereof.

The starting materials in form of very pure oxides as well as carbonates have been mixed in stoichiometric proportions together with small amounts of flux ($NH_4Cl$). In a first step the mixture will be fired in an alumina crucible at 1,200° C. in an inert gas atmosphere ($N_2$ or noble gas) for 2-4 hours. After pre-firing the material will be milled again. In a second step the mixing will be fired in an alumina crucible at 1,200° C. in weakly reducing atmosphere for additional 2 hours. After that the material will be milled, washed, dried and sieved. The luminescent material has an emission maximum at 592 nm.

TABLE 1

$Eu^{2+}$-activated Cu—Sr—Ca mixed silicate compared with a comparable $Eu^{2+}$-activated Sr—Ca-Silicate at 450 nm excitation wavelength

| | Copper containing compound $Cu_{0.05}Sr_{1.7}Ca_{0.25}SiO_4$: Eu | Comparison without copper $Sr_{1.7}Ca_{0.3}SiO_4$: Eu |
|---|---|---|
| Emission intensity (%) | 104 | 100 |
| Wavelength (nm) | 592 | 588 |

Preparation of the luminescent material having formula:

Starting materials: $CuO$, $BaCO_3$, $ZnO$, $MgO$, $SiO_2$, $Eu_2O_3$ and/or any combination thereof.

The starting materials in form of very pure oxides as well as carbonates have been mixed in stoichiometric proportions together with small amounts of flux ($NH_4Cl$). In a first step the mixture will be fired in an alumina crucible at 1,100° C. in inert gas atmosphere for 1-2 hours. After pre-firing the material will be milled again. In a second step the mixing will be fired in an alumina crucible at 1,235° C. in reducing atmosphere for 2 hours. After that the material will be milled, washed, dried and sieved. The luminescent material has an emission maximum at 467 nm.

TABLE 2

Eu$^{2+}$-activated Copper containing mixed
silicate compared with comparable Eu$^{2+}$-activated
silicate without Copper at 400 nm excitation wavelength

|  | Copper containing compound $Cu_{0.2}Sr_2Zn_{0.2}Mg_{0.6}Si_2O_7$: Eu | Comparison without copper $Sr_2Zn_2Mg_{0.6}Si_2O_7$: Eu |
|---|---|---|
| Emission intensity (%) | 101.5 | 100 |
| Wavelength (nm) | 467 | 465 |

Results obtained concerning copper containing silicate mixed crystals activated by Rare Earths are shown in table 3.

TABLE 3

Optical properties of some copper-alkaline-earth Silicate mixed crystals excitable by long wave ultraviolet and/or by visible light and their luminous density in % at 400 nm excitation wavelength

| Composition | Possible excitation range in nm | Luminous density at 400 nm excitation compared with no copper containing compounds in % | Peak wave length of copper containing materials in nm | Peak wave length of materials without copper in nm |
|---|---|---|---|---|
| $Cu_{0.02}(Ba, Sr_{0.2}, Ca, Zn)_{1.98}SiO_4$: Eu | 360-500 | 108.2 | 565 | 560 |
| $Cu_{0.05}Sr_{1.7}Ca_{0.25}SiO_4$: Eu | 360-470 | 104 | 592 | 588 |
| $Cu_{0.05}Li_{0.002}Sr_{1.5}Ba_{0.448}SiO_4$: Gd, Eu | 360-470 | 102.5 | 557 | 555 |
| $Cu_{0.2}Sr_2Zn_{0.2}Mg_{0.6}Si_2O_7$: Eu | 360-450 | 101.5 | 467 | 465 |
| $Cu_{0.02}Ba_{2.8}Sr_{0.2}Mg_{0.98}Si_2O_8$: Eu, Mn | 360-420 | 100.8 | 440, 660 | 438, 660 |
| $Cu_{0.2}Ba_{2.2}Sr_{0.80}Zn_{0.8}Si_2O_8$: Eu | 360-430 | 100.8 | 448 | 445 |
| $Cu_{0.2}Ba_3Mg_{0.8}Si_{1.99}Ge_{0.01}O_8$: Eu | 360-430 | 101 | 444 | 440 |
| $Cu_{0.5}Zn_{0.5}Ba_2Ge_{0.2}Si_{1.8}O_7$: Eu | 360-420 | 102.5 | 435 | 433 |
| $Cu_{0.8}Mg_{0.2}Ba_3Si_2O_8$: Eu, Mn | 360-430 | 103 | 438, 670 | 435, 670 |
| $Cu_{0.2}Ba_{4.6}Sr_{0.4}Ca_{2.8}Si_4O_{16}$: Eu | 360-470 | 101.8 | 495 | 491 |

EXAMPLE 2

Copper containing mixed crystals with Alkaline Earth germanates and/or germanate-silicates with the Formula 2 as follows:

$$a(M'O).b(M''_2O).c(M'''X).d(GeO_2).e(M'''O).$$
$$f(M''''_2O_3).g(M'''''_oO_p).h(M''''''_xO_y) \quad \text{(Formula 2)}$$

wherein M' is Cu;

M'' is at least one or more monovalent elements from the group consisting of Li, Na, K, Rb, Cs, Au, and Ag;

M''' is at least one or more divalent elements from the group consisting of Be, Mg, Ca, Sr, Ba, Zn, Cd, and Mn;

M'''' is at least one or more trivalent elements from the group consisting of Sc, Y, B, Al, Ga, In, and La;

M''''' is at least one or more elements from the group consisting of Si, Ti, Zr, Mn, V, Nd, Ta, W, Mo, and Nb;

M'''''' is at least one or more elements from the group consisting of Bi, Sn, Pr, Sm, Eu, Gd, Dy, and Tb;

X is at least one or more elements from the group consisting of F, Cl, Br, and I;

$0 < a \leq 2$;
$0 \leq b \leq 2$;
$0 \leq c \leq 10$;
$0 < d \leq 10$;
$0 \leq e \leq 14$;
$0 \leq f \leq 14$;
$0 \leq g \leq 10$;
$0 \leq h \leq 2$;
$1 \leq o \leq 2$;
$1 \leq p \leq 5$;
$1 \leq x \leq 2$; and
$1 \leq y \leq 5$ Preparation of the luminescent material with following formula:

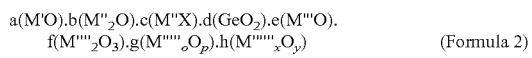

Starting materials: CuO, SrCO$_3$, GeO$_2$, SiO$_2$, MnCO$_3$ and/or any combination thereof.

The starting materials in form of oxides as well as carbonates have been mixed in stoichiometric proportions together with small amounts of flux (NH$_4$Cl). In a first step the mixture will be fired in an alumina crucible at 1,100° C. in oxygen containing atmosphere for 2 hours. After pre-firing the material will be milled again. In a second step the mixing will be fired in an alumina crucible at 1,180° C. in oxygen containing atmosphere for 4 hours again. After that the material will be milled, washed, dried and sieved. The luminescent material has an emission maximum at 658 nm.

TABLE 4

Mn-activated Cu—Sr mixed germanate-silicate compared with Mn-activated germanate-silicate without Copper at 400 nm excitation wavelength

|  | Copper doped compound $Cu_{0.46}Sr_{0.54}Ge_{0.6}Si_{0.4}O_3$: Mn | Comparison without copper $SrGe_{0.6}Si_{0.4}O_3$: Mn |
|---|---|---|
| Emission intensity (%) | 103 | 100 |
| Wavelength (nm) | 658 | 655 |

Results obtained in respect to copper containing Alkaline Earth mixed crystals from the group consisting of germanates or germanate-silicates are shown in table 5.

TABLE 5

Optical properties of some copper containing Germanate/Germanate-Silicate mixed crystals excitable by long wave ultraviolet and/or by visible light and their luminous density in % at 400 nm excitation wavelength

| Composition | Possible excitation range in nm | Luminous density at 400 nm excitation compared with no copper containing compounds in % | Peak wave length of copper containing mixed crystals in nm | Peak wave length of materials without copper in nm |
|---|---|---|---|---|
| $Cu_{0.46}Sr_{0.54}Ge_{0.6}Si_{0.4}O_3$: Mn | 360-400 | 103 | 658 | 655 |
| $Cu_{0.02}Sr_{0.38}Ba_{0.90}Ca_{0.6}Si_{0.98}Ge_{0.02}O_4$: $Eu_{0.1}$ | 360-470 | 102 | 563 | 560 |
| $Cu_{1.45}Mg_{26.55}Ge_{9.4}Si_{0.6}O_{48}$: Mn | 360-400 | 102 | 660 | 657 |
| $Cu_{1.2}Mg_{26.8}Ge_{8.9}Si_{1.1}O_{48}$: Mn | 360-400 | 103.8 | 670 | 656 |
| $Cu_4Mg_{20}Zn_4Ge_5Si_{2.5}O_{38}F_{10}$: Mn | 360-400 | 101.5 | 658 | 655 |
| $Cu_{0.05}Mg_{4.95}GeO_6F_2$: Mn | 360-400 | 100.5 | 655 | 653 |
| $Cu_{0.05}Mg_{3.95}GeO_{5.5}F$: Mn | 360-400 | 100.8 | 657 | 653 |

In respect to changes in some properties of the compounds under consideration by introducing Cu the following physico—chemical changes could be achieved:

TABLE 6 changes of lattice parameters - results of x ray diffractometry

| Phosphor composition | $a_0/□$ | $b_0/□$ | $c_0/□$ |
|---|---|---|---|
| (Ba,Sr,Ca,Eu)—$SiO_4$ without copper | 5.691 | 7.190 | 9.775 |
| (Ba,Sr,Ca,Eu)—$SiO_4$: 0.005 Mol Cu | 5.688 | 7.185 | 9.777 |
| (Ba,Sr,Ca,Eu)—$SiO_4$: 0.1 Mol Cu | 5.684 | 7.180 | 9.779 |

As shown in Table 6, caused by the slight changes of the lattice parameters of the phosphor contained copper, a slight change in the emission spectra can be observed. In general a shift of 0.5-1.0 nm to shorter wavelengths occurs.

TABLE 7 changes in Zeta potential and mobility of phosphors containing different concentration of copper compared with phosphors without copper.

| Phosphor composition | Zeta-potential | Mobility |
|---|---|---|
| (Ba,Sr,Ca,Eu)—$SiO_4$ without copper | −3.5 mV | $-2.4 \cdot 10^{-5}$ cm²/Vs |
| (Ba,Sr,Ca,Eu)—$SiO_4$: 0.005 Mol Cu | −3.3 mV | $-2.3 \cdot 10^{-5}$ cm²/Vs |
| (Ba,Sr,Ca,Eu)—$SiO_4$: 0.01 Mol Cu | −2.5 mV | $-1.8 \cdot 10^{-5}$ cm²/Vs |
| (Ba,Sr,Ca,Eu)—$SiO_4$: 0.1 Mol Cu | +0.33 mV | $+1.4 \cdot 10^{-6}$ cm²/Vs |

Result of these changes are changes in sensitivity against water. The water stability of copper containing compounds are much higher than the water stability of compounds without copper. (table 8)

TABLE 8 time related relative intensity of compounds with and without copper at 85° C. and at 100% humidity.

| Phosphor composition | rel. intensity after 24 h | rel. intensity after 100 h | rel. intensity after 200 h | rel. intensity after 500 h | rel. intensity after 1000 h |
|---|---|---|---|---|---|
| (Ba,Sr,Ca,Eu)—$SiO_4$ without copper | 98.3 | 96.0 | 93.3 | 84.7 | 79.3 |
| (Ba,Sr,Ca,Eu)—$SiO_4$: 0.005 Mol Cu | 100.0 | 99.6 | 98.6 | 96.3 | 94.0 |
| (Ba,Sr,Ca,Eu)—$SiO_4$: 0.01 Mol Cu | 98.6 | 98.5 | 95.8 | 92.8 | 90.1 |
| (Ba,Sr,Ca,Eu)—$SiO_4$: 0.1 Mol Cu | 98.7 | 98.0 | 96.4 | 93.2 | 90.0 |

As shown in Table 7 and 8, this is caused by the decreasing mobility of the Alkaline Earths ions in the dissolving process. That means the rate and from this number of dissolved cations becomes lower resulting in lower hydrolysis and higher water stability.

What is claimed is:

1. Luminescent materials for long-wave ultraviolet light or visible light excitation, comprising: activated inorganic mixed crystals containing copper, the luminescent materials having the following Formula 1

$a(CuO).b(M'O).c(M''X).d(M''_2O).e(M'''_2O_3).$
$f(M''''_oO_p).g(SiO_2).h(M'''''_xO_y)$, wherein:

M' is selected from the group consisting of Be, Mg, Ca, Sr, Ba, Zn, Cd, Mn, and a combination thereof;

M'' is selected from the group consisting of Li, Na, K, Rb, Cs, Au, Ag, and a combination thereof;

M''' is selected from the group consisting of B, Al, Ga, In, and a combination thereof;

M'''' is selected from the group consisting of Ge, V, Nb, Ta, W, Mo, Ti, Zr, Hf, and a combination thereof;

M''''' is selected from the group consisting of Bi, Sn, Sb, Sc, Y, La, Ce, Pr, Nd, Pm, Sm, Eu, Gd, Tb, Dy, Ho, Er, Tm, Yb, Lu, and a combination thereof;

X is selected from the group consisting of F, Cl, Br, I, and a combination thereof;

$0 < a \leq 2$;
$0 < b \leq 8$;
$0 \leq c \leq 4$;
$0 \leq d \leq 2$;
$0 \leq e \leq 2$;
$0 \leq f \leq 2$;
$0 < g \leq 10$;
$0 < h \leq 5$;

$1 \leq o \leq 2$;
$1 \leq p \leq 5$;
$1 \leq x \leq 2$;
$1 \leq y \leq 5$, and
a ratio of $(a+b):((c+2d)+2e+o \times f+g)$ ranges from about 1.5:1 to about 2:1.

2. Luminescent materials for long-wave ultraviolet light or visible light excitation, comprising activated inorganic mixed crystals containing copper, the luminescent materials having the following with Formula 2

$$a(CuO).b(M'_2O).c(M'X).d(GeO_2).e(M''O).f(M'''_2O_3).g(M''''_oO_p).h(M'''''_xO_y),$$ wherein:

M' is selected from the group consisting of Li, Na, K, Rb, Cs, Au, Ag, and a combination thereof;
M" is selected from the group consisting of Be, Mg, Ca, Sr, Ba, Zn, Cd, Mn, and a combination thereof;
M'" is selected from the group consisting of Sc, Y, B, Al, Ga, In, La, and a combination thereof;
M"" is selected from the group consisting of Si, Ti, Zr, Mn, V, Nb, Nd, Ta, W, Mo, and a combination thereof;
M'"" is selected from the group consisting of Bi, Sn, Pr, Sm, Eu, Gd, Dy, Tb, and a combination thereof;
X is selected from the group consisting of F, Cl, Br, I, and a combination thereof;

$0 < a \leq 2$;
$0 \leq b \leq 2$;
$0 \leq c \leq 10$;
$0 < d \leq 10$;
$0 \leq e \leq 14$;
$0 \leq f \leq 14$;
$0 \leq g \leq 10$;
$0 \leq h \leq 2$;
$1 \leq o \leq 2$;
$1 \leq p \leq 5$;
$1 \leq x \leq 2$;
$1 \leq y \leq 5$; and
a ratio of $(a+e):((2b+c)+d+2f+o \times g)$ ranges from about 1:1 to about 5:1.

3. The luminescent materials according to claim 2, wherein a concentration of Strontium is less than 0.4 Mol/Mol phosphor.

4. The luminescent materials according to claim 1, wherein the activated inorganic mixed crystals convert primary long-wave ultraviolet in the range of 300-400 nm and/or blue radiation in the range of 380-500 nm generated by one or more single primary elements within a light emitting device, to produce light in the visible region of the spectrum having a high color rendering index Ra>90.

* * * * *